(12) United States Patent
Brauer et al.

(10) Patent No.: US 10,192,302 B2
(45) Date of Patent: Jan. 29, 2019

(54) COMBINED PATCH AND DESIGN-BASED DEFECT DETECTION

(71) Applicant: KLA-Tencor Corporation, Milpitas, CA (US)

(72) Inventors: Bjorn Brauer, Beaverton, OR (US); Santosh Bhattacharyya, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 110 days.

(21) Appl. No.: 15/356,799

(22) Filed: Nov. 21, 2016

(65) Prior Publication Data

US 2017/0345142 A1    Nov. 30, 2017

Related U.S. Application Data

(60) Provisional application No. 62/341,545, filed on May 25, 2016.

(51) Int. Cl.
*G06K 9/62* (2006.01)
*G06T 7/00* (2017.01)

(52) U.S. Cl.
CPC .......... *G06T 7/0006* (2013.01); *G06K 9/6202* (2013.01); *G06T 7/001* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 8,595,666 B2 | 11/2013 | Hayakawa et al. | |
| 2005/0205781 A1 | 9/2005 | Kimba | |
| 2010/0188657 A1* | 7/2010 | Chen | G01N 21/9501 |
| | | | 356/237.5 |
| 2011/0286656 A1 | 11/2011 | Kulkarni et al. | |
| 2012/0050518 A1* | 3/2012 | Miyata | G01N 21/9501 |
| | | | 348/79 |
| 2013/0236083 A1 | 9/2013 | Wang et al. | |
| 2014/0192352 A1* | 7/2014 | Bamba | G01N 21/9501 |
| | | | 356/237.5 |
| 2014/0314305 A1 | 10/2014 | Yoshikawa | |
| 2016/0261786 A1* | 9/2016 | Ahn | H04N 5/23212 |

OTHER PUBLICATIONS

ISA/KR, International Search Report for PCT/US2017/033976 dated Aug. 3, 2017.

* cited by examiner

*Primary Examiner* — Eileen M Adams
(74) *Attorney, Agent, or Firm* — Hodgson Russ LLP

(57) ABSTRACT

Defect detection is performed by comparing a test image and a reference image with a rendered design image, which may be generated from a design file. This may occur because a comparison of the test image and another reference image was inconclusive due to noise. The results of the two comparisons with the rendered design image can indicate whether a defect is present in the test image.

20 Claims, 3 Drawing Sheets

COMBINED PATCH AND DESIGN-BASED DEFECT DETECTION

CROSS-REFERENCE TO RELATED APPLICATIONS

This application claims priority to the provisional patent application filed May 25, 2016 and assigned U.S. App. No. 62/341,545, the disclosure of which is hereby incorporated by reference.

FIELD OF THE DISCLOSURE

This disclosure relates to defect detection.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Detecting that a defect is in a test image can be important to a semiconductor manufacturer. Defects can be detected by comparing an image of a wafer to a reference image. For example, "double detection" can be used to detect defects. Using this double detection technique, the defect needs to be detected in two difference images. Each of these two difference images subtracts the test image from one of a first reference image or a second reference image. However, if one of the reference images is influenced by wafer noise, then the defect may not be flagged even if it is detected when comparing the test image to the other reference image.

Therefore, improved systems and techniques for defect detection are needed.

BRIEF SUMMARY OF THE DISCLOSURE

In a first embodiment, a system is provided. A system comprises a review tool and a controller in electronic communication with the review tool. The review tool includes a stage configured to hold a wafer and an image generation system configured to generate a test image of the wafer. The controller is configured to: compare the test image and a first reference image; determine that a defect is present in the test image based on comparing the test image and the first reference image; compare the first reference image to a rendered design image to generate a first value; compare the test image to the rendered design image to generate a second value; and determine a result corresponding to whether the second value is greater than the first value.

The controller can include a processor, an electronic data storage unit in electronic communication with the processor, and a communication port in electronic communication with the processor and the electronic data storage unit. The electronic data storage unit may include the first reference image.

The image generation system can be configured to use at least one of an electron beam, a broad band plasma, or a laser to generate the image of the wafer. In an instance, the review tool is a scanning electron microscope.

If the result indicates that the first value is greater than or equal to the second value, the controller can be further configured to report that no defect is present in the test image. If the result indicates that the second value is greater than the first value, the controller can be further configured to compare the second value to a threshold. If the second value exceeds the threshold, the controller can be configured to report that a defect is present in the test image. If the second value is less than the threshold, the controller can be configured to report that no defect is present in the test image.

The rendered design may be based on a design file.

Comparing the test image and the first reference image can include subtracting the first reference image from the test image.

Comparing the first reference image and the rendered design image can include subtracting the rendered design image from the first reference image. Comparing the test image to the rendered design image can include subtracting the rendered design image from the test image.

In a second embodiment, a method is provided. The method comprises: comparing, using a controller, a test image and a first reference image of a wafer; determining, using the controller, that a defect is present in the test image based on comparing the test image and the first reference image; comparing, using the controller, the first reference image to a rendered design image to generate a first value; comparing, using the controller, the test image to the rendered design image to generate a second value; and determining, using the controller, a result, wherein the result corresponds to whether the second value is greater than the first value.

The method can further comprise comparing the test image and a second reference image prior to comparing the test image to the rendered design and determining, using the controller, that no defect is present in the test image based on comparing the test image and the second reference image. The second reference image may have more noise than the first reference image.

If the result is that the first value is greater than or equal to the second value, the method can further comprise reporting, using the controller, that no defect is present in the test image. If the result is that the second value is greater than the first value, the method can further comprise comparing, using the controller, the second value to a threshold. If the second value exceeds the threshold, the method can further comprise reporting, using the controller, that a defect is present in the test image. If the second value is less than the threshold, the method can further comprise reporting, using the controller, that no defect is present in the test image.

The rendered design may be based on a design file.

Comparing the test image and the first reference image can include subtracting the first reference image from the test image.

Comparing the first reference image and the rendered design image can include subtracting the rendered design image from the first reference image. Comparing the test image to the rendered design image can include subtracting the rendered design image from the test image.

The method can further comprise loading the wafer onto a stage of a review tool and imaging the wafer on the stage of the review tool.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Using double detection to detect defects provides information about whether the defect is in the test or the reference image. Double detection also can prevent false positives. By definition, the defect has to be detected in both the difference images (e.g., comparing first reference image—test image and comparing second reference image—test image). If one of the reference images (e.g., the second reference image) is significantly influenced by wafer noise, the defect might not be flagged even though it was detected when comparing the test image to the other reference image (e.g., the first reference image). Embodiments disclosed herein improve defect detection when a wafer is noisy in a reference image. To address possible wafer noise in a reference image, the test image is compared to rendered design image. This technique flags defects even when they are only single detected. This technique also can address random wafer noise, which cannot be easily reduced, excluded, or corrected using previous techniques.

Figure 1:
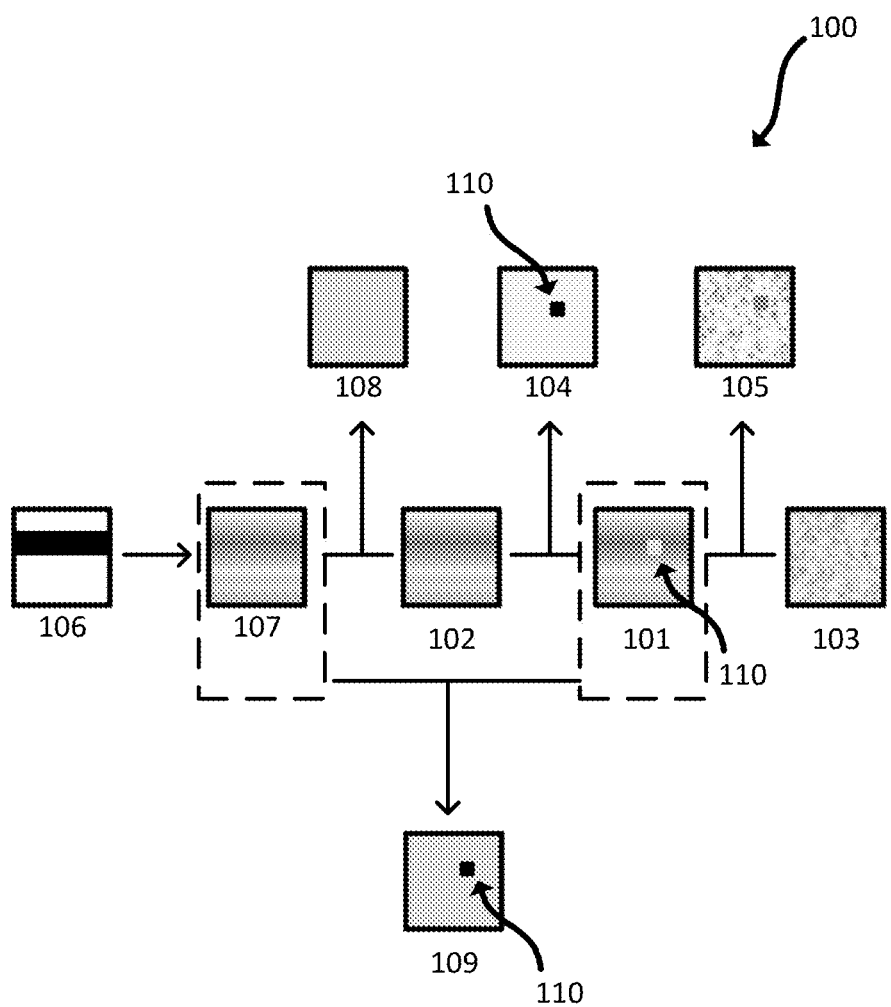
FIG. 1 represents exemplary images used in an embodiment in accordance with the present disclosure.

FIG. 1 represents images used in an embodiment of the techniques disclosed herein. The diagram 100 includes a test image 101. The test image 101 may be, for example, an image from an optical microscope or a scanning electron microscope (SEM) image. The test image 101 includes a defect 110, which is illustrated as a square. The defect 110 may be, for example, a particle, an empty via, a bridge, a protrusion, a pattern defect, missing material fill, or another type of defect on a semiconductor wafer.

Also included in the diagram 100 are a first reference image 102 and a second reference image 103. The first reference image 102 and the second reference image 103 are the same part of the wafer or die as the test image 101. The second reference image 103 includes noise. For example, the second reference image 103 may include more noise than either the first reference image 102 or the test image 101. The noise in the second reference image 103 may be random wafer noise due to critical dimension (CD) variation, previous layer noise, line edge roughness, film thickness variation, and/or another type of noise. Varying amounts of noise in the second reference image 103 may occur. However, no defect may be detected if the second reference image 103 has so much noise that the difference gray level of the defect derived from second difference image 105 is lower than the difference gray level of the noise or does not exceed a defined threshold.

When comparing the test image 101 to the first reference image 102, the first difference image 104 enables detection of the defect 110. However, a defect 110 may not be detected when comparing the test image 101 to the second reference image 103 due to the noise in the second reference image 103. Even if the defect 110 is viewable in the second reference image 105 formed by comparing the test image 101 to the second reference image 103, the defect 110 may be lost in the noise of the second difference image 105. Thus, double detection does not occur even though a defect 110 is detected in the first difference image 104.

A rendered design image 107 is generated from a design clip 106. The design clip 106 may be part of a design file for the wafer. The rendered design image 107 can be generated using various techniques. For example, a wireframe design can be passed through an optical simulation process that takes into account various optical components of the inspection tool and physical wafer properties. These optical components can include a numerical aperture of the objective lens, a wavelength of light used for inspection, or optical apertures in illumination, light collection paths, or other components. Wafer properties such as a material used for the current and previous design layer, process layer thickness, design from the current and several previous layers, or other features also may be used. Based on this information, the simulation system can solve differential equations and achieve numerical close form solution to obtain a gray level image.

The first reference image 102 is compared to the rendered design image 107 to form a third difference image 108. The third difference image 108 does not show the defect 110. This can help verify that the defect 110 is not in the first reference image 102 and can prevent false positives.

The test image 101 is compared to the rendered design image 107 to form a fourth difference image 109. The fourth difference image 109 enables detection of the defect 110. This fourth difference image 109 can provide double detection of the defect 110 with the first difference image 102.

Figure 2:
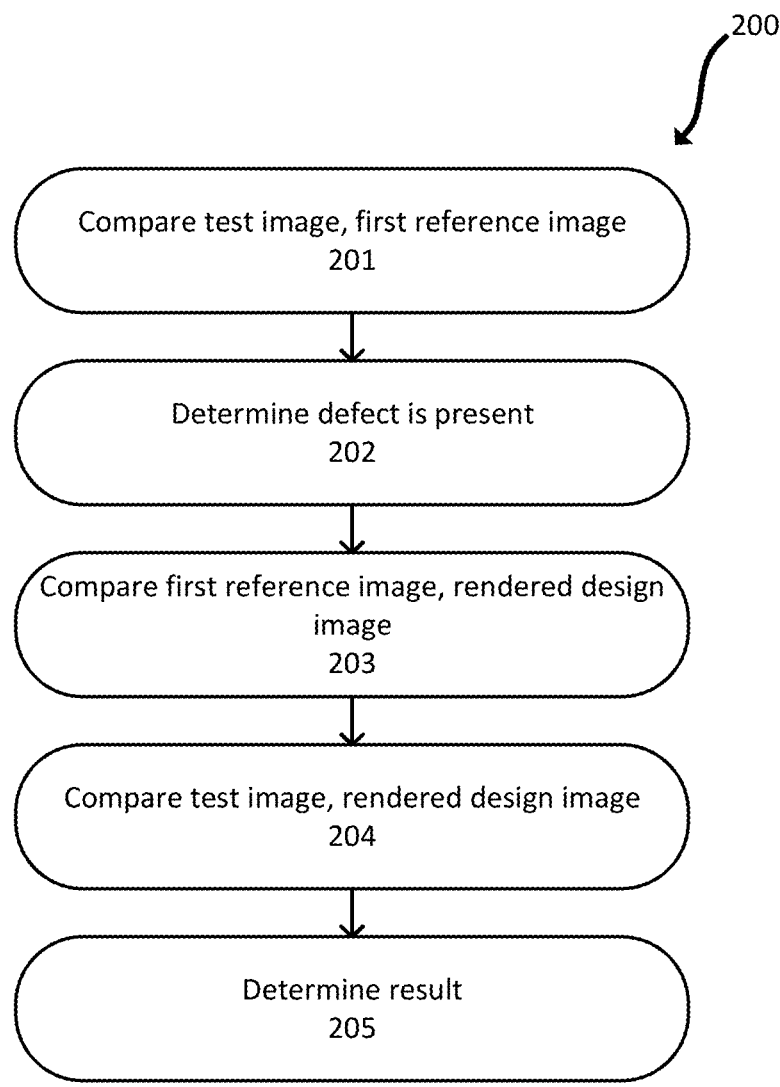
FIG. 2 is a flowchart of a method in accordance with the present disclosure.

FIG. 2 is a flowchart of a method 200. In the method 200, a test image and first reference image are compared 201. Based on the comparison 201, whether a defect is present can be determined. A defect is determined 202 to be present based on comparing 201 of the test image and the first reference image. The first reference image and a rendered design image are compared 203. The test image and the rendered design image are compared 204. The rendered design image can be based on a design file. A result is determined 205, which can indicate whether a defect is present. Comparison 203 and comparison 204 may occur in either order.

The comparison 203 of the first reference image and the rendered design image and the comparison 204 of the test image and the rendered design image can each generate a value. These values can be used to determine the result 205. For example, a first value of the comparison 203 may be greater than or equal to a second value of the comparison 204. This can indicate that no defect is present in the test image. In another example, the second value of the comparison 204 is greater than the first value of the comparison 203, which can indicate that a defect may be present. The value can be derived from subtracting the gray level of a first image from the gray level of a second image pixel by pixel. In an instance, the first image can be the first reference image and the second image can be the rendered design image. In another instance, the first image is the test image and the second image is the rendered design image. This can lead to a difference image gray level for every pair of pixels that was used for the image subtraction. If the difference image gray level of the first reference image minus the rendered design image is larger than the one from the test image minus the rendered design image then this indicates that there is no defect in the test image.

If the second value of the comparison 204 is greater than the first value of the comparison 203, then the second value of the comparison 204 may be compared to a threshold. If the second value of the comparison 204 exceeds the threshold, then presence of a defect in the test image may be reported. If the second value of the comparison 204 is less than a threshold, then it may be reported that no defect is present in the test image. If the second value of the comparison 204 equals the threshold, then this may indicate that a defect is present, no defect is present, or that further analysis is required. If the maximal gray level in the difference image of a reference image minus rendered design image is only marginally smaller than the one from the difference image of a test image minus rendered design image, then it may still be a nuisance or noise event. The thresholds can be set by an SEM reviewing several defects of a hot scan (e.g., a scan where the threshold is set to a small value). This will allow classification of the defects which were found on the inspection tool. The threshold can be set by a user in a way so that all the defects of interest are likely to exceed the threshold but the nuisance does not exceed the threshold. Thus, nuisance events can be excluded.

In an instance, the first and second values are absolute values.

The result can be reported to a user, such as a semiconductor manufacturer.

In an instance, the test image is compared to a second reference image prior to making any comparisons with the rendered design image or prior to generating the rendered design image. However, the second reference image may have more noise than the first reference image. The second reference image also may have more noise than the test image. This noise can prevent double detection even if the comparison 201 between the test image and the first reference image indicates that a defect is present. The noise can impair a comparison of the second reference image and the test image and, consequently, the results may indicate that no defect is present.

The test image can be generated using a review tool. A wafer may be loaded onto a stage of the review tool and imaged on the stage of the review tool to generate the test image.

The comparison between the test image and the first or second reference image can involve subtraction of one image from another. The comparison between the rendered design image and the test image or the first reference image also can involve subtraction of one image from another. First, the two images which need to be subtracted are aligned to each other as much as possible (e.g., sub pixel accuracy). The gray level of the pixel at location 1,1 in the first image is subtracted from the gray level of the pixel at location 1,1 in second image. The subtracting is then performed at the next pixel and so on until the difference gray level has been calculated for every pixel pair.

Figure 3:
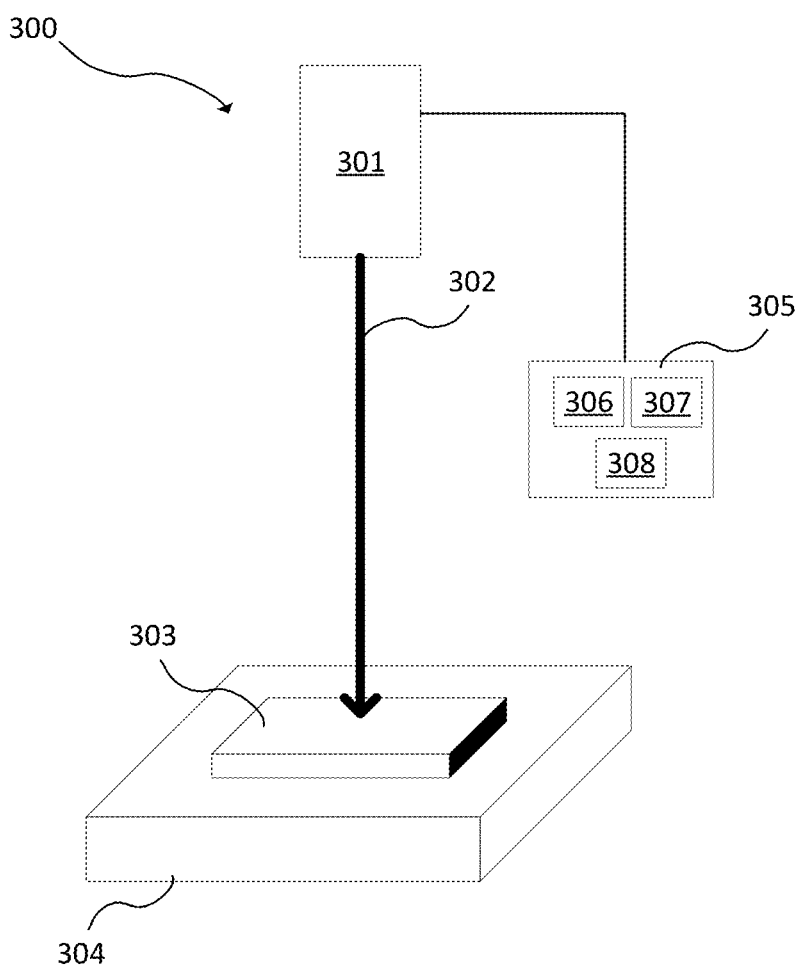
FIG. 3 is a block diagram of a system in accordance with the present disclosure.

FIG. 3 is a block diagram of a system in accordance with the present disclosure. The defect review system 300 includes a stage 304 configured to hold a wafer 303 or other workpiece. The stage 304 may be configured to move or rotate in one, two, or three axes.

The defect review system 300 also includes an image generation system 301 configured to generate an image of a surface of the wafer 303. The image may be for a particular layer or region of the wafer 303. In this example, the image generation system 301 produces an electron beam 302 to generate a test image 303. Other image generation systems 301 are possible, such as those that use broad band plasma or laser scanning. For example, dark field imaging or bright field imaging can be performed by the image generation system 301. The defect review system 300 and/or image generation system 301 can generate a test image of the wafer 303.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

In a particular example, the defect review system 300 is part of or is an SEM. Images of the wafer 303 are generated by scanning the wafer 303 with a focused electron beam 302. The electrons are used to produce signals that contain information about the surface topography and composition of the wafer 303. The electron beam 302 can be scanned in a raster scan pattern, and the position of the electron beam 302 can be combined with the detected signal to produce an image.

The defect review system 300 communicates with a controller 305. For example, the controller 305 can communicate with the image generation system 301 or other components of the defect review system 300. The controller 305 can include a processor 306, an electronic data storage unit 307 in electronic communication with the processor 306, and a communication port 308 in electronic communication with the processor 306. It is to be appreciated that the controller 305 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 305 to implement the various methods and functions described herein may be stored in controller readable storage media, such as a memory in the electronic data storage unit 307, within the controller 305, external to the controller 305, or combinations thereof.

The controller 305 may be coupled to the components of the defect review system 300 in any suitable manner (e.g., via one or more transmission media, which may include "wired" and/or "wireless" transmission media) such that the controller 305 can receive the output generated by the defect review system 300, such as output from the imaging device 301. The controller 305 may be configured to perform a number of functions using the output. For instance, the controller 305 may be configured to review defects on the wafer 303 using the output. In another example, the controller 305 may be configured to send the output to an electronic data storage unit 307 or another storage medium without performing defect review on the output. The controller 305 may be further configured as described herein, such as to perform the embodiment of FIG. 2.

The controller 305, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 3, electronic data storage unit 307 or other storage medium may contain non-transitory computer-readable medium that includes program instructions executable on the controller 305. The computer-implemented method may include any step(s) of any method(s) described herein.

Program instructions implementing methods such as those described herein may be stored on computer-readable medium, such as in the electronic data storage unit 307 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Controller 305 may be configured according to any of the embodiments described herein. For example, the controller 305 may be programmed to perform some or all of the steps of FIG. 2.

While disclosed as part of a defect review system, the controller 305 described herein may be configured for use with inspection systems. In another embodiment, the controller 305 described herein may be configured for use with a metrology system. Thus, the embodiments as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

The embodiments disclosed herein enable defect detection on noisy wafers. Defects that otherwise may be missed are instead detected using techniques described herein. Sensitivity to a particular defect of interest (DOI) can be improved. Improved ability to find such a DOI can save semiconductor manufacturers time and money. The embodiments disclosed herein also provide higher sensitivity to defects on wafer noise-limited wafers. Furthermore, throughput improvement can be achieved by not generating a full multi-die auto threshold (MDAT) cloud for the second reference image. Instead, a small patch where defective pixels are present can be used to arbitrate. If noise is too high (low signal-to-noise ratio (SNR)), the rendered design image can be used as a reference image. A patch is a small image, such as one that is 32 pixels by 32 pixels. This is relatively small compared to what is usually used for statistical calculations and to identify the outliers (e.g., defective pixels). For example, MDAT statistics may typically be derived from 1000 pixels by 1000 pixels sized image frames. The new implementation allows use of the small image patch for the second reference image.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:
1. A system comprising:
a review tool, wherein the review tool includes:
a stage configured to hold a wafer; and
an image generation system configured to generate a test image of the wafer; and
a controller in electronic communication with the review tool, wherein the controller is configured to:
compare the test image and a first reference image;
determine that a defect is present in the test image based on comparing the test image and the first reference image;
compare the first reference image to a rendered design image to generate a first value that pertains to a potential defect;
compare the test image to the rendered design image to generate a second value that pertains to the potential defect; and
determine a result corresponding to whether the second value is greater than the first value.

2. The system of claim 1, wherein the controller includes a processor, an electronic data storage unit in electronic communication with the processor, and a communication port in electronic communication with the processor and the electronic data storage unit, and wherein the electronic data storage unit includes the first reference image.

3. The system of claim 1, wherein the review tool is a scanning electron microscope.

4. The system of claim 1, wherein the image generation system is configured to use at least one of an electron beam, a broad band plasma, or a laser to generate the image of the wafer.

5. The system of claim 1, wherein the result is that the first value is greater than or equal to the second value, and wherein the controller is further configured to report that no defect is present in the test image.

6. The system of claim 1, wherein the result is that the second value is greater than the first value, and wherein the controller is further configured to compare the second value to a threshold.

7. The system of claim 6, wherein the second value exceeds the threshold, and wherein the controller is configured to report that a defect is present in the test image.

8. The system of claim 6, wherein the second value is less than the threshold, and wherein the controller is configured to report that no defect is present in the test image.

9. The system of claim 1, wherein the rendered design image is based on a design file.

10. The system of claim 1, wherein comparing the test image and the first reference image includes subtracting the first reference image from the test image.

11. The system of claim 1, wherein comparing the first reference image and the rendered design image includes subtracting the rendered design image from the first reference image, and wherein comparing the test image to the rendered design image includes subtracting the rendered design image from the test image.

12. A method comprising:
    comparing, using a controller, a test image and a first reference image of a wafer;
    determining, using the controller, that a defect is present in the test image based on comparing the test image and the first reference image;
    comparing, using the controller, the first reference image to a rendered design image to generate a first value that pertains to a potential defect;
    comparing, using the controller, the test image to the rendered design image to generate a second value that pertains to the potential defect; and
    determining, using the controller, a result, wherein the result corresponds to whether the second value is greater than the first value.

13. The method of claim 12, further comprising:
    comparing the test image and a second reference image prior to comparing the test image to the rendered design image, wherein the second reference image has more noise than the first reference image; and
    determining, using the controller, that no defect is present in the test image based on comparing the test image and the second reference image.

14. The method of claim 12, wherein the result is that the first value is greater than or equal to the second value, and further comprising reporting, using the controller, that no defect is present in the test image.

15. The method of claim 12, wherein the result is that the second value is greater than the first value, and further comprising comparing, using the controller, the second value to a threshold.

16. The method of claim 15, wherein the second value exceeds the threshold, and further comprising reporting, using the controller, that a defect is present in the test image.

17. The method of claim 15, wherein the second value is less than the threshold, and further comprising reporting, using the controller, that no defect is present in the test image.

18. The method of claim 12, wherein the rendered design image is based on a design file.

19. The method of claim 12, wherein comparing the test image and the first reference image includes subtracting the first reference image from the test image, wherein comparing the first reference image and the rendered design image includes subtracting the rendered design image from the first reference image, and wherein comparing the test image to the rendered design image includes subtracting the rendered design image from the test image.

20. The method of claim 12, further comprising:
    loading the wafer onto a stage of a review tool; and
    imaging the wafer on the stage of the review tool.

* * * * *